United States Patent
Moran et al.

[11] 4,016,422
[45] Apr. 5, 1977

[54] RADIATION DOSIMETRY BY MEASUREMENT OF POLARIZATION AND DEPOLARIZATION CURRENTS

[75] Inventors: Paul Richard Moran; Ervin B. Podgorsak, both of Madison, Wis.; David E. Fields, Oak Ridge, Tenn.

[73] Assignee: Wisconsin Alumni Research Foundation, Madison, Wis.

[22] Filed: May 12, 1975

[21] Appl. No.: 576,272

Related U.S. Application Data

[63] Continuation of Ser. No. 346,720, April 2, 1973, which is a continuation-in-part of Ser. No. 290,726, Sept. 20, 1972, abandoned.

[52] U.S. Cl. .............................. 250/336; 250/390; 250/395
[51] Int. Cl.² ......................................... G01T 1/16
[58] Field of Search ......... 250/336, 337, 390, 391, 250/392, 395, 484, 472, 473

[56] References Cited

UNITED STATES PATENTS

| 3,420,999 | 1/1969 | Distenfeld | 250/391 |
| 3,450,879 | 6/1969 | Seppi | 250/336 |
| 3,699,337 | 10/1972 | Hoy | 250/484 |
| 3,761,710 | 9/1973 | Yamashita et al. | 250/337 |

*Primary Examiner*—Davis L. Willis
*Attorney, Agent, or Firm*—Burmeister, York, Palmatier, Hamby & Jones

[57] ABSTRACT

This invention provides a method of measuring exposure to radiation, particularly x-rays, gamma rays and other forms of penetrating radiation. A dielectric body is provided and is equipped with a pair of electrodes on opposite sides thereof. In accordance with one procedure which may be called radiation induced thermally activated depolarization (RITAD), an electrostatic bias polarization is produced in the dielectric body, preferably by heating it to an elevated temperature, impressing a voltage between the electrodes to produce internal polarization in the body, and cooling the body while maintaining the voltage, so as to freeze in the bias polarization. The voltage is then removed, and the electrodes may be short circuited. The body is then exposed to the radiation to be measured. After such exposure, a current measuring circuit is established between the electrodes. The electrical currents in such circuit are observed and measured as the energy level of the body is raised, preferably by heating the body. One or more current peaks related to the radiation are observed at temperatures where no current is observed in the absence of the exposure to radiation. The magnitude of such current peaks is a measure of the total radiation dosage. Such observed current peaks are indicative of radiation induced thermally activated depolarization in the dielectric body. Many different dielectric materials may be employed, such as calcium fluoride, strontium fluoride, lithium fluoride and various ceramic materials such as magnesium oxide and beryllium oxide.

In a modified procedure, which may be called radiation induced thermally activated polarization (RITAP), the dielectric body is not given an initial bias polarization, but rather is exposed to radiation without any such initial polarization. After such exposure, the electrodes on the dielectric body are connected into a series circuit which includes a current measuring instrument and a battery or some other source of a uni-directional voltage. The electrical current in such circuit is then observed and measured as the energy level of the dielectric body is raised, preferably by heating the body. If the dielectric body has been exposed to radiation, a polarization current peak is observed at a characteristic temperature. The magnitude of the peak is a measure of the total radiation dosage. The voltage source may then be removed from the circuit so that the current measuring instrument is connected directly across the electrodes. The dielectric body is then heated to a higher temperature. At one or more characteristic temperatures, one or more depolarization current peaks are observed. The direction of the depolarization currents is opposite from the direction of the polarization current. The magnitude of the depolarization current peaks is also a measure of the total radiation dosage.

30 Claims, 10 Drawing Figures

RADIATION DOSIMETRY BY MEASUREMENT OF POLARIZATION AND DEPOLARIZATION CURRENTS

This application is a continuation of our copending application, Ser. No. 346,720 filed Apr. 2, 1973, which was a continuation-in-part of our application Ser. No. 290,726, filed Sept. 20, 1972 and now abandoned.

This invention relates to radiation dosimetry and to other fields of use where it is desired to measure or observe radiation.

Radiation dosimetry systems are employed in hospitals, clinics, laboratories and other establishments where x-rays, gamma rays, beta rays and other forms of penetrating radiation are used, to guard against the possibility that workers in the establishment may be exposed accidentally to unsafe amounts of such radiation. Radiation dosimetry systems are also employed in connection with therapeutic use of x-rays, gamma rays and other forms of penetrating radiation in the treatment of patients, to monitor and record the amount of radiation which is employed in the treatment of each patient.

Various radiation dosimetry systems are known. One common system involves the use of film badges or tags which are worn by persons who may possibly be exposed to penetrating radiation. Such film badges contain photographic film which is surrounded by opaque material so that the film is protected from exposure to light. X-rays or other penetrating radiation will pass through the opaque material and will cause darkening of the film when it is developed. Periodically the film is removed from each badge and is developed and inspected to determine whether the film has been exposed to penetrating radiation. This dosimetry system has the disadvantage that the procedure involved in developing and checking the films are time comsuming and costly. Moreover this system is not well adopted for accurately measuring the dosage of penetrating radiation to which each film Another system involves the thermoluminescene (TL) which is produced in certain materials when they are exposed to x-rays, gamma rays and other forms of ionizing radiation. Examples of such materials are lithium fluoride and calcium fluoride. In this dosimetry system, each worker or patient wears a badge or the like containing a small piece or sample of such thermoluminescent material. Periodically, each sample is checked for thermoluminescence by heating it while observing and measuring any light which may be emitted by the sample. The light may be measured by using an optical system to focus it upon a photo-multiplier tube, employed in conjunction with the associated electronic amplifiers and electrical measuring equipment. If the sample has been exposed to x-rays or other ionizing radiation, it will emit light as it is heated through certain characteristics temperature ranges. If the emitted light is plotted against the temperature, one or more peaks will be observed at characteristic temperatures. The magnitude of these peaks is a measure of the amount of radiation exposure. This dosimetry system has the disadvantage that elaborate and highly sensitive measuring equipment is required to measure the thermoluminescence. Electrical noise impairs the accuracy of the measurements at low levels of thermoluminescene, for which the signal to noise ratio is low. It is difficult to achieve reproducible results because the results are affected by the optical quality of the sample. Moreover, it is hard to standardize the adjustment of the optical system.

The present invention provides radiation dosimetry methods or systems which are extremely sensitive so that small radiation doses can be accurately measured. The systems have very favorable signal-to-noise ratios.

One system of the present invention involves the use of radiation induced thermally activated depolarization (RITAD) which can be produced in a large number of different dielectric materials. Examples of such materials are calcium fluoride, strontium fluoride, barium fluoride, lithium fluoride, sodium fluoride, aluminum oxide, magnesium oxide, and beryllium oxide. It is believed that virtually any dielectric material may be employed if it is refined to a sufficient degree of purity and if the remaining impurities are sufficiently controlled.

In the RITAD method of the present invention, a sample of the dielectric material is given an electrostatic bias polarization so that internal or local electrostatic fields are produced within the sample. This is preferably done by providing a pair of electrodes on opposite sides of the sample, heating the sample to a more or less elevated temperature, impressing an external voltage between the electrodes to subject the sample to an external electrostatic field, and cooling the sample so as to freeze in the bias polarization which is produced by the external electrostatic field. The voltage is maintained during the cooling operation and is then removed so that the sample may be placed in a badge or other holder. After the voltage has been removed, the electrodes are preferably short circuited to prevent the accumulation of static charges on the electrodes. The sample is then carried by a worker or patient, or is otherwise used in a situation where it may be exposed to the penetrating radiation which is to be measured.

It has been found that exposure to radiation causes changes in the polarization of the sample. Periodically, each sample is checked for such polarization by connecting the electrodes into a measuring circuit which includes a sensitive ammeter, capable of measuring any small currents which may flow through the circuit between the electrodes. The sample is then heated so as to raise its temperature in a progressive manner, preferably at a more or less constant rate. It has been found that if the sample has been exposed to x-rays, gamma rays or other ionizing radiation, on or more current peaks will be observed at characteristics temperatures. Such current peaks are not observed if the sample has not been exposed to radiation. The magnitude of the observed current peaks is a measure of the radiation dosage.

If the sample is heated to a sufficiently high temperature, the bias polarization will be neutralized, which will cause another current peak. This peak is observed whether or not the sample has been exposed to radiation. However, the magnitude of this peak decreases gradually with increasing radiation dosage, particularly at extremely high levels of radiation dosage.

The electrical current signals due to the RITAD effect are strong and easy to measure and are remarkably free from noise. Thus, the signal to noise ratio is high. The sample can be reused repeatedly.

The present invention also contemplates a modified method or system which involves radiation induced thermally activated polarization (RITAP). Generally, any of the materials which are suitable for RITAD dosimetry are also suitable for RITAP dosimetry. In this method, the dielectric body is not given an initial bias depolarization, but is left unpolarized.

The initially unpolarized dielectric body is exposed to the dosage or radiation which is to be measured. The electrodes on the opposite sides of the dielectric body are then connected into a circuit which includes a current measuring instrument and a source of uni-directional voltage. The energy level of the dielectric body is then progressively increased, preferably by heating the body so as to increase its temperature. As the body is heated, a polarization current peak is observed. This current peak is not present if the body has not been exposed to radiation. The magnitude of the polarization current peak is a measure of the radiation dosage.

After the polarization current peak has been observed, it is preferred to remove the voltage source from the circuit so that the current measuring instrument is connected directly across the electrodes on opposite sides of the dielectric body. With further heating of the dielectric body, one or more depolarization current peaks are observed and measured. The direction of the depolarization current is opposite from the direction of the polarization current. The magnitude of the depolarization current peaks is also a measure of the radiation dosage. Generally, the depolarization current peaks correspond to the depolarization current peaks which are observed in carrying out the RITAD method, as previously described.

Various other objects, advantages and features of the present invention will appear from the following description, taken with the accompanying drawings, in which:

FIGS. 1, 2 and 3 are diagrammatic view illustrating successive steps in a method to be described as an illustrative embodiment of the present invention. In particular, FIG. 1 illustrates the production of the electrostatic bias polarization in the sample of dielectric material.

Figure 1:
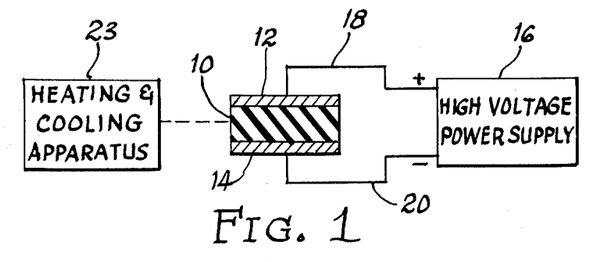
Figure 2:
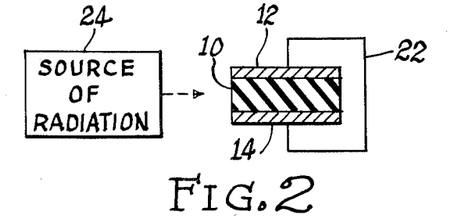
FIG. 2 illustrates the exposure of the material to radiation.
Figure 3:
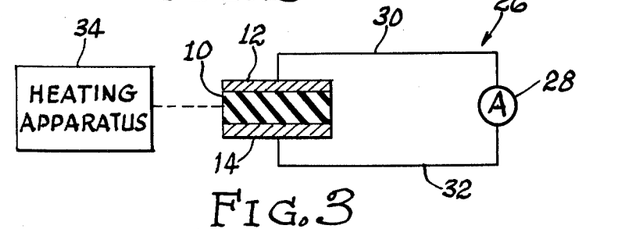
FIG. 3 shows the measurement of depolarization currents in the measuring circuit between the electrodes as the sample is heated.

As just indicated, FIGS. 1 to 3 illustrate a method of radiation dosimetry, utilizing a sample 10 of dielectric material. Various dielectric materials may be employed, but for the sake of specific illustration, it will be assumed initially that the dielectric material is calcium fluoride. The sample 10 may be of any convenient or suitable size. Thus, in certain actual tests, the samples were made from optical quality high purity calcium fluoride crystals, grown by Harshaw Chemical Company (batch 1970). The crystals were cleaved into plates measuring about 1 × 0.5 centimeter and with a thickness of about 0.15 centimeter.

FIG. 1 illustrates the preferred procedure for giving the sample 10 an electrostatic bias polarization. Preferably, electrodes 12 and 14 are provided on opposite sides of the sample 10. The electrodes 12 and 14 may be in the form of thin metal plates held against the opposite faces of the sample 10 by spring pressure. However, the construction and mounting of the electrodes is not critical. The material used in the electrodes and the type of contact between the electrodes and the sample do not materially affect the results obtained.

The dielectric sample 10 is heated to a more or less elevated temperature, and a unidirectional electrical voltage is applied between the electrodes 12 and 14. Such voltage impresses an external electrostatic field upon the sample 10. The field produces internal bias polarization in the sample 10. The strength of the bias polarization depends upon the magnitude of the voltage. Consequently, it is preferred to employ a fairly high voltage. In FIG. 1, the voltage is derived from a high voltage power supply 16 having its positive and negative output terminals connected to electrodes 12 and 14 by leads 18 and 20. The rapidity with which the bias polarization is produced depends upon the magnitude of the voltage and the temperature to which the sample 10 is heated. It is preferred to employ a fairly high temperature at which the bias polarization is achieved within a few seconds. For calcium fluoride, a suitable temperature is about 230° C. Higher temperatures may be employed if desired. Moreover, the bias polarization can be achieved at somewhat lower temperature, but more time will be required. After the bias polarization has been achieved, the sample 10 is cooled, while maintaining the external voltage, so as to freeze in the bias polarization. The voltage may then be removed, and the electrodes 12 and 14 may be short circuited by a lead 22, as shown in FIG. 2.

The dielectric sample 10 retains the bias polarization indefinitely, or at least for a very long time, without any externally applied voltage.

It will be seen that the arrangement of FIG. 1 includes heating or cooling apparatus 23 for heating the sample 10 to a suitable elevated temperature, and then cooling the sample to freeze in the bias polarization.

In the case of calcium fluoride, the sample may be cooled rapidly from the elevated temperature to about 100° C. while maintaining the external voltage, which can then be removed. The sample may then be allowed to cool down to room temperature.

The dielectric sample 10 retains a very strong electretlike bias polarization which is believed to be due to an ionic thermocurrent (ITC) state. It is believed that this bias polarization state can be developed in virtually any dielectric if the level of impurities is suitably controlled. The electret-like state is believed to be due to volume polarization of a dielectric containing uniformly distributed traces of charge compensated impurities. The bias polarization produces local electric fields in the dielectric sample.

As shown in FIG. 2, the sample 10, with it internal bias polarization, is exposed to the ionizing radiation to be measured, supplied by a suitable source 24. The radiation may be in the form of x-rays, gamma rays or other penetrating radiation. It is believed that the ionizing radiation produces polarizable pairs of trapped electrons and holes in the dielectric sample 10, the polarization of the electrons and holes being due to the internal electric field produced by the bias polarization.

FIG. 3 illustrates the preferred method of measuring the radiation induced polarization. A current measuring circuit 26 is provided between the electrodes 12 and 14 of the irradiated sample 10. Such current measuring circuit 26 may comprise a sensitive ammeter 28 connected to the electrodes 12 and 14 by leads 30 and 32. Since the currents to be measured are very small, the ammeter 28 may be in the form of a picoammeter capable of measuring currents on the order of one picoampere, which is $10^{-12}$ amp. The picoammeter 28 is preferably of the chart recording type of produce a permanent graphical record or chart.

The currents in the measuring circuit 26 are observed, measured and recorded while the sample 10 is progressively heated. For this purpose, the arrangement of FIG. 3 includes heating apparatus 34.

During the heating of the irradiated dielectric sample 10, currents are observed in the measuring circuit 26 which are not observed if the sample has not been exposed to radiation. Normally such currents are observed as the sample is heated through one or more temperature ranges. When the temperature of the sample is raised to one of such temperature ranges, a current begins to flow in the measuring circuit 26 and rises to a peak as the temperature of the sample continues to increase. The current then decreases with further increases in the temperature. These current peaks may be called dosimetry peaks because the magnitude of these current peaks is a function of the radiation dosage to which the dielectric sample has been exposed. If the sample has not been exposed to radiation, no such dosimetry peak is observed.

Figure 5:
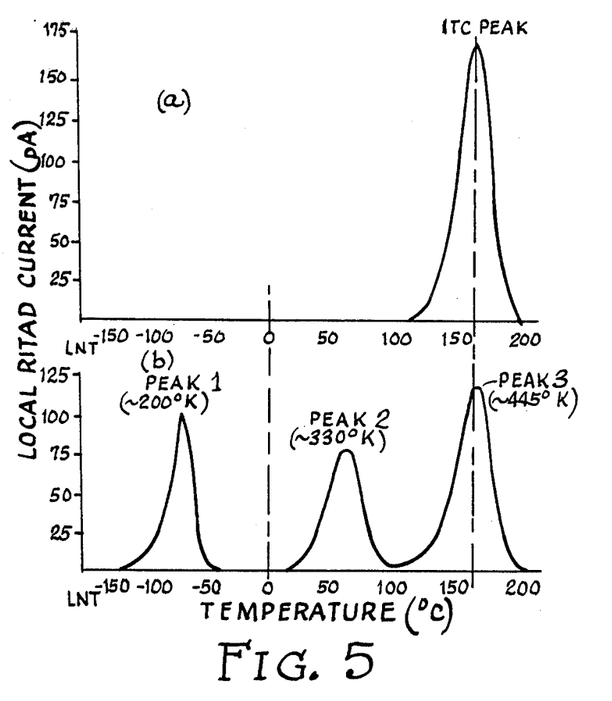
FIG. 5 comprises graphs showing the depolarization currents which are observed when the sample is heated. The upper graph illustrates the observed currents when the sample has not been exposed to radiation, while the lower graphs show the RITAD currents which are observed when the sample has been exposed to radiation.

FIG. 5b is a plot of the current in the measuring circuit against the temperature of the dielectric sample. In the test represented by FIG. 5, the sample was made of high purity calcium fluoride of the 1970 batch obtained from Harshaw Chemical Company, as previously mentioned. After being bias polarized in the manner previously described, the sample was exposed to about 40 Roentgens (R) of 85 kilovolt peak X-rays filtered to give 35 kilo-electron-volts (KeV) effective photon energy at the calcium fluoride sample. The corresponding dose conversion is about 10 rads per Roentgen. After being irradiated at 77° Kelvin (K), the sample was heated so as to raise its temperature at the rate of 0.5° K per second. As will be evident from FIG. 5b, two dosimetry current peaks were observed, the first at about 200° K and the second at about 330° K. It will be understood that the sample may be exposed to radiation at room temperature, rather than at 77° K. In that case, when the sample is heated, only the dosimetry peak at 330° K is observed.

In the test represented by FIG. 5b, the heating of the sample was continued so that its temperature was raised well above the second dosimetry peak. Another current peak was observed at about 445° K. This current peak is due to the neatralization or depolarization of the initial electrostatic bias polarization. Such depolarization is due to the ionic thermocurrent (ITC) which develops in the dielectric sample at elevated temperatures. This ITC peak is observed whether or not the sample has been exposed to radiation. This fact is illustrated by FIG. 5a which is a plot of the current in the measuring circuit when the dielectric sample is heated without having been exposed to radiation. The ITC peak at about 445° K is observed and actually has a slightly greater magnitude than in the case of FIG. 5b, because the exposure to radiation causes gradual decay of the ITC peak, as will be discussed further in connection with FIG. 6.

It has been found that the magnitude of the dosimetry peaks is a measure of the radiation dosage to which the sample has been exposed. However, the area under each current peak, representing the integrated current, is a more accurate measure of the radiation dosage. The integrated current can readily be measured by known or suitable electronic measurement techniques.

Figure 6:
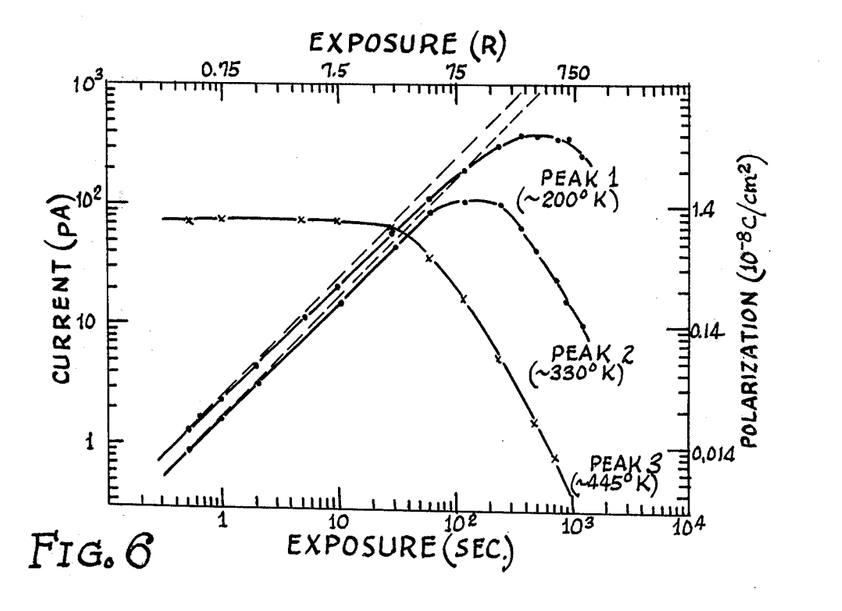
FIG. 6 is a set of graphs showing the relationship between the magnitude of the depolarization current peaks and the radiation dosage.

FIG. 6 is a set of graphs illustrating the relationship between the radiation dosage and the magnitude of the current peaks. In the test represented by FIG. 6, the irradiation rate was 0.75R per second. It has been found, however, that changing the irradiation rate does not cause any significant change in the results represented by FIG. 6. In FIGS. 5 and 6, the first and second dosimetry peaks are labeled peak 1 and peak 2. The graphs of these peaks in FIG. 6 show that the magnitude of each dosimetry peak increases as a direct function of the radiation exposure, except for extremely great exposures, which actually cause the magnitude of the current peak to drop off. The magnitude of the ITC peak, labeled peak 3 in FIGS. 5 and 6, decreases gradually with increasing radiation exposure, and then drops off rapidly at extremely great radiation exposures.

It is believed that the exposure of the dielectric sample to ionizing radiation produces pairs of electrons and holes which are polarized by the internal electrostatic fields due to the bias polarization. The electrons and holes are trapped so that the polarization caused by the radiation persists. When the sample is heated, the electrons and holes are mobilized so that depolarization occurs in the sample. This causes depolarization currents in the external measuring circuit between the electrodes. Such depolarization currents are represented by peaks 1 and 2 in FIGS. 5b and 6.

In FIG. 5b, the time breadth of each of the dosimetry peaks is about 70 seconds at the scanning rate of 0.5° K per second. It is possible to obtain an approximation of the total depolarization charge by multiplying each dosimetry peak current by 70.

In the linear growth region represented by the approximately linear portions of the graphs for peaks 1 and 2 in FIG. 6, the responsive of each of the dosimetry peaks to increasing radiation is about $4 \times 10^{-10}$ coulomb per square centimeter per Roentgen. This is a surprisingly high response which can be measured very easily and accurately. In this regard, the present invention compares very favorable with prior radiation dosimetry systems. For example in the radioelectret type of radiation dosimetry response reported for Teflon by C. G. Wiseman, et al, in Journ. Chem. Phys. 26; 521 (1957), a much smaller response was obtained of only about $5 \times 10^{-15}$ coulomb per square centimeter per Roentgen.

The current signals associated with the dosimetry peaks of FIG. 5b may be referred to as local RITAD, because these signals constitute radiation induced thermally activated depolarization currents which are dependent upon the local electrostatic fields in the sample due to the bias polarization.

It has been found that the local RITAD signals are remarkably noise free. In this respect, the present invention compares very favorably with other radiation dosimetry systems. For example, in the Teflon radioelectret system reported by Murphy, et al in Jour. Chem. Phys. 38; 2400 (1963), a signal to noise ratio of 40 to 1 was observed for a radiation exposure of about $10^7$ R. However, it has been estimated that the local RITAD signals for calcium fluoride provide a similar signal to noise ratio for a radiation exposure of only about $8 \times 10^{-4}$R.

The present invention also compares very favorably with the radiation dosimetry systems involving thermoluminescence (TL) measurements. Samples using the same calcium fluoride material as was employed for the test represented by FIGS. 5 and 6 can also be used for TL dosimetry. At radiation exposures above 100 milliroengten (mR), both the local RITAD current of the present invention and the TL photomultiplier current measurement precisions are limited by shot noise. For the same samples, the same radiation exposure, and the same electronic instrumentation, the signal to noise power ratio of the local RITAD current readout is at least 40 decibels greater than that for the most sensitive TL peak signal. The dosimetry peak at 200° K is closely correlated with a corresponding TL peak, but the dosimetry peak at 300° K falls near a minimum within a group of three incompletely resolved TL peaks characteristic of these calcium fluoride samples.

For radiation exposures below about 100mR, it has been found that the measurement precision of the RITAD current becomes limited by instrument noise. Nevertheless, a signal to noise ratio of about 200 to 1 has been achieved for a 75mR exposure, despite an instrument noise figure in exces of 20 decibels, when the current signal is integrated over about 100 seconds to obtain the total charge release, it is possible to achieve a readout precision of about $\pm 10\%$ for an exposure somewhat less than $10^{-4}$R.

The local RITAD effects are believed to be generated by thermally activated mobility of trapped electrons and/or holes. Two possible mechanisms may be involved: first, during irradiation, the transient mobility of electrons and holes allows them to separate in the bias-polarization field, leading to a frozen-in transportive polarization; during subsequent thermally induced mobility, recombination of electrons and holes produces the RITAD depolarization signal. Second, trapped electrons and holes are formed during irradiation with little polarization; during readout, however, thermally activated mobility allows the detrapped carriers to drift without recombination and to produce the RITAD signal as they attempt to depolarize the pre-existing bias-polarization state. It is believed that both processes may simultaneously exist in the observed RITAD phenomena.

The particular $CaF_2$ RITAD states represented in FIGS. 5 and 6, because of their relatively low activation temperatures, are subject to fading at room temperature. Thus, these samples of $CaF_2$ are primarily useful for radiation dosimetry at temperatures below room temperature.

As previously indicated, many other dielectric materials can be employed in the radiation dosimetry system of the present invention, besides calcium fluoride. For example, such dielectric materials include other alkaline earth fluorides, such as magnesium fluoride, barium fluoride and strontium fluoride; alkali metal fluorides, such as lithium fluoride and sodium fluoride; other alkaline earth halides; other alkali metal halides; alkaline earth oxide ceramics such as magnesium oxide; other ceramics such as aluminum oxide and beryllium oxide; alkaline earth phosphate minerals such as natural bone mineral (calcium hydroxy phosphate) and apatite, which is calcium (hydroxy, fluro, chloro) phosphate; and resinous dielectrics, such as Teflon and epoxy.

It has been found that the electrodes 12 and 14 do not have to be in good electrical contact with the dielectric sample 10. In fact, a vacuum gap can be provided between each of the electrodes and the sample without materially affecting the results obtained by the radiation dosimetry method. The local RITAD readout currents resin unchanged which indicates that these currents are compensating currents, induced by changes in the internal polarization.

Figure 4:
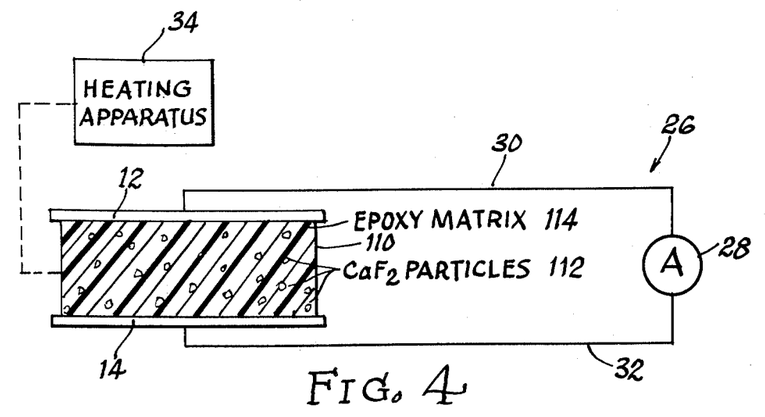
FIG. 4 is a diagrammatic view somewhat similar to FIG. 3, but showing a composite sample comprising particles of one dielectric material dispersed in another dielectric material.

FIG. 4 illustrates a modified radiation dosimetry method, which is the same as previously described, except that it utilizes a compound dosimeter tablet 110 between the electrodes 12 and 14. In one actual test, the compound tablet 110 was made up by pulverizing a calcium fluoride single crystal sample which had been previously employed in the dosimetry system of FIGS. 1-3. The sample was ground into a relatively coarse powder, having a particle size of a few tenths of a millimeter. The powder was then mixed as a 10% by volume suspension in high resistivity epoxy resin. The mixture was cast into a small compound dosimeter tablet as shown at 110 in FIG. 4. It will be seen that the tablet 110 includes calcium fluoride particles 112, suspended in an epoxy matrix 114.

The compund dosimetry sample was used in the same dosimetry method as described in connection with FIGS. 1-3, and the results were the same, except that the sensitivity per cubic centimeter of the dosimeter was reduced to about 10% of that observed with the single crystal sample of calcium fluoride. This reduction corresponds to the 10% filling factor of the active material. At temperatures above about 230° C, additional signals were observed during the readout, due to the epoxy material.

The lack of any necessity for good electrical contact between the sample dielectric and the electrodes and the results obtained with compound dielectric dosimeter table make it clear that surface conductance effects do not interfere with the local RITAD dosimetry method of the present invention.

Compound tablets for radiation dosimetry have many useful applications. For example, a compound dosimeter comprising calcium fluoride or some other suitable radiation responsive material, suspended in polyethylene, or some other hydrogen-rich material, is valuable for use in the dosimetry of fast neutrons, which interact with the hydrogen atoms to produce recoil protons. The calcium fluoride then responds to the ionizing radiation associated with the recoil protons.

Actual test results have been obtained with various dielectric materials, used in the radiation dosimetry method of the present invention. The following table sets forth various test results, including the approximate temperatures of the dosimetry peaks that were observed, and the temperatures of the ITC peaks, associated with the depolarization of the bias polarization.

| DIELECTRIC MATERIAL | TEMPERATURES OF DOSIMETRY PEAKS | TEMPERATURES OF ITC PEAKS |
| --- | --- | --- |
| Strontium fluoride | −97° C, 52° C, 95° C | 230° C |
| Barium fluoride | 25° C | 230° C |
| Sodium fluoride | −145° C noisy | 220° C |
| Alumina | −140° C weak | 400° C |
| Lithium Fluoride | −150° C weak, 155° C, overlaps ITC peak | 195° C |

The purity of the dielectric material employed in the sample has a considerable effect upon the results of the radiation dosimetry method of the present invention. If the level of impurities is extremely low, the radiation sensitivity of the material may be low. However, a high level of impurities may tend to suppress the radiation sensitivity.

For example, three batches of high purity, optical calcium fluoride were tested. These batches were obtained from Harshaw Chemical Company and were dated from 1968, 1970 and 1972. It was found that the 1970 batch was the most sensitive. The 1968 batch was about a factor of four less sensitive, while the 1972 batch was about 30% less sensitive than the 1970 batch.

The local RITAD radiation dosimetry system of the present invention has the advantageous of high radiation response, high sensitivity, low intrinsic noise, absence of any requirements for good optical quality, no necessity for electrically conductive integrity of the sample, simplicity of dosimeter fabrication, and simplicity of readout.

Figure 7:
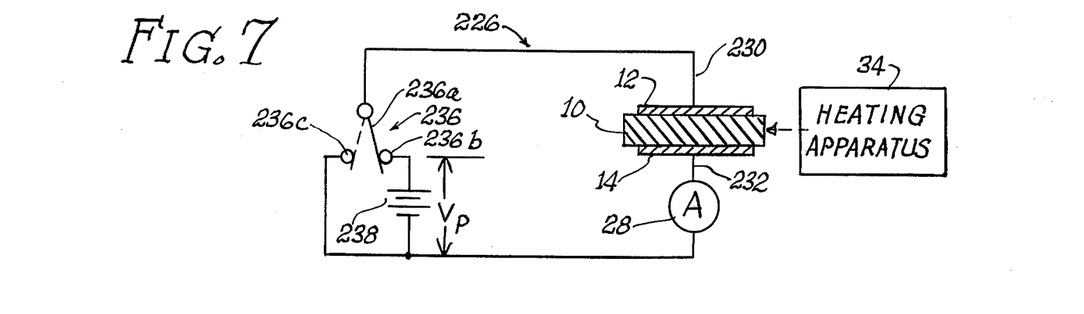
FIG. 7 is a schematic circuit diagram to illustrate a modified dosimetry procedure.
Figure 8:
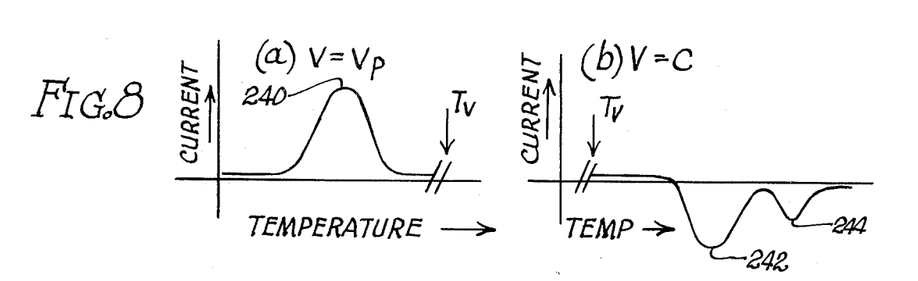
FIG. 8 comprises graphs representing the polarization and depolarization currents which are observed in carrying out the modified procedure.

FIGS. 7 and 8 illustrate a modified radiation dosimeter procedure or method utilizing radiation induced thermally activated polarization (RITAP). This method may utilize the same dosimeter sample or dielectric body 10 as described in connection with FIGS. 1–3. As previously described, electrodes 12 and 14 are provided on opposite sides of the body 10. The electrodes 12 and 14 may be clamped against the body 10 or may be deposited thereon in the form of metal or other conductive coatings. The electrodes 12 and 14 may be provided in any other known or suitable manner.

In the dosimetry system or method of FIGS. 7 and 8, the dielectric body 10 is not given an initial bias polarization, prior to being exposed to radiation, but rather is exposed to radiation without any initial polarization.

When it is desired to measure the radiation dosage to which the dielectric sample or body 10 has been exposed, the electrodes 12 and 14 are connected into a series circuit 226 which includes the highly sensitive ammeter 28 as previously described. In this case, the series circuit also includes leads 230, 232 and 234; a selector switch 236; and a battery or some other source 238 of a uni-directional voltage which is designated $V_p$ in FIG. 7. The switch 236 may comprise a contactor 236a which is movable between contacts 236b and 236c.

Initially, the contactor 236a is moved to its full line position in which it engages the contact 236b, which is connected to the voltage source 238. In this position of the switch 236, the voltage source 238 and the ammeter 28 are in series across the electrodes 12 and 14.

Energy is then supplied to the dielectric sample 10 so as to measure its energy level. Preferably, this is done by heating the dielectric sample 10. For this purpose, the heating apparatus 34 may be employed as previously described in connection with FIGS. 2 and 3.

By heating the dielectric sample 10, the temperature of the sample is progressively scanned upwardly. During such temperature scan, polarization currents are produced in the series circuit 226 and are indicated by the sensitive ammeter 28. Such polarization currents indicate that the sample 10 has been exposed to ionizing radiation. In the absence of such radiation exposure, the polarization currents are not observed. Thus, the polarization currents are induced by radiation and are thermally activated. Accordingly, this dosimetry procedure utilizes radiation induced thermally activted polarization (RITAP).

FIG. 8a is a graph in which the current in the series circuit 226 is plotted against the temperature of the dielectric sample 10. When the external polarization voltage $V_p$ is in the circuit, the upward scanning of the temperature produces a polarization current peak 240 in a characteristic temperature range depending upon the dielectric material employed in the sample 10. Both the basic dielectric material and the presence of impurities are factors in determining the location and magnitude of the current peak 240. The magnitude of the polarization current peak 240 is a measure of the radiation dosage which has been supplied to the dielectric sample 10. If no radiation has been supplied to the sample 10, the polarization peak 240 is not observed.

When the temperature of the dielectric sample 10 has been raised above the temperature range associated with the polarization current peak 240, it is advantageous to move the switch contactor 236a to its broken line position, as shown in FIG. 7, in which the voltage source 238 is removed from the series circuit 226. In this position, the switch 238 is operative to connect the lead 230 to the lead 234 so that the ammeter 28 is connected directly across the electrodes 12 and 14 with zero voltage in the series circuit 226. The upward temperature scan is then continued by supplying additional heat to the dielectric sample 10 so as to raise its temperature.

At one or more characteristic temperatures, one or more depolarization current peaks 242 and 244 are observed, as illustrated in FIG. 8b, which is a graph in which the current through the ammeter 28 is plotted against the temperature, above the temperature designated TV at which the voltage source 238 is switched out of the circuit so that the voltage in the circuit will be zero. The magnitude of each of the depolarization peaks 242 and 244 is also a measure of the radiation dosage.

The graphs of FIGS. 8a and 8b illustrate the polarization and depolarization peaks which are obtained when the dielectric sample 10 is made of calcium fluoride. The temperature ranges associated with the polarization and depolarization current peaks are generally different for different materials.

It will be seen from FIG. 8 that the direction of the depolarization currents is opposite from the direction of the polarization currents. This is to be expected because the polarization currents are analogous to the charging of a capacitor while the depolarization currents correspoond to the discharging of the capacitor. The fact that the depolarization currents are observed is an indication that the polarization currents are truly due to polarization of the dielectric body 10, rather than conduction currents. If the current peak 240 were due to radiation induced thermally stimulated conductivity (RITSC), the depolarization peaks 242 and 244 would not be observed.

Figure 9:
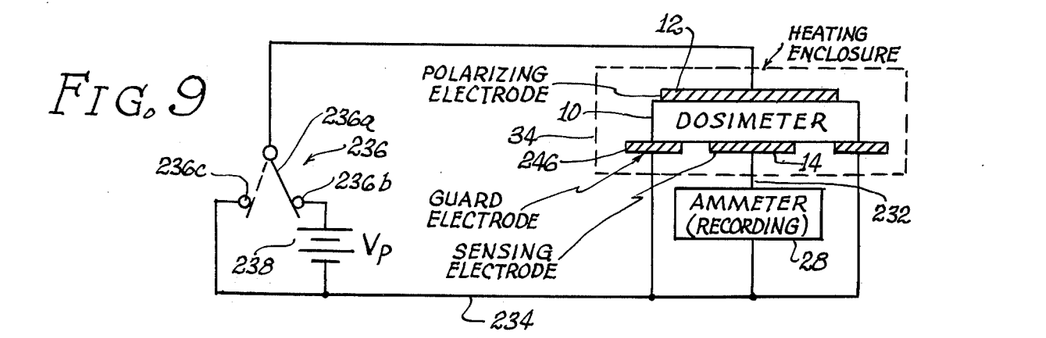
FIGS. 9 and 10 are schematic circuit diagrams showing alternative arrangements for carrying out the modified dosimetry procedure.

FIG. 9 illustrates a modified arrangement in which the electrode 14 is surrounded by one or more guard electrodes 246 which engage the edge portion of the dosimeter body 10 to eliminate or minimize the effects of leakage currents along the surface of the dosimeter body 10. Such leakage currents tend to produce noise and spurious signals.

It will be seen that the guard electrode 246 is connected directly to the lead 234. Thus, any currents flowing between the electrode 12 and the guard electrode 246 do not flow through the sensitive ammeter 28, which is connected between the main or sensing electrode 14 and the lead 234. The guard electrode 246 is preferably ring-shaped and is arranged to engage all of the edge portions of the dosimeter body 10 so that there is no direct path along the surface of the body 10 between the electrodes 12 and 14. The arrangement of FIG. 9 improves the signal-to-noise ratio which is achieved by the dosimeter system.

In FIG. 9, the heating apparatus 34 is shown as a heating enclosure which incorporates suitable heating means such as one or more electrical heating elements.

Figure 10:
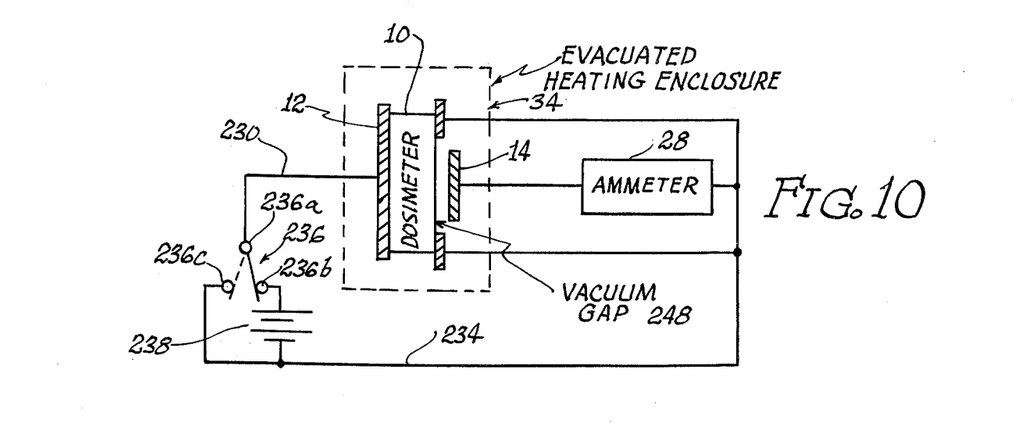

FIG. 10 illustrates a modified dosimeter system which illustrates the fact that the electrodes 12 and 14 do not have to be in conductive or ohmic engagement with the dielectric dosimeter body 10 because the currents to the electrodes are polarization and depolarization currents, rather than conduction currents.

The system of FIG. 10 is the same as that of FIG. 9 except that a vacuum gap 248 is provided between the electrode 14 and the dosimeter body 10. The vacuum gap 248 prevents any conduction current from flowing between the electrode 14 and the dosimeter body 10. It will be understood that the vacuum gap 248 may be made quite narrow and preferably is only wide enough to obviate any conductive contact between the electrode 14 and the dosimeter body 10. The vacuum gap could also be provided between the electrode 12 and the dosimeter body 10.

It has been found that the provision of the vacuum gap 248 does not affect the polarization and depolarization currents which have been described in connection with FIGS. 7–9. However, the provision of the vacuum gap 248 does have the disadvantage of leaving the electrode 14 free to vibrate because of the lack of a solid mechanical connection between the electrode 14 and the dosimeter body. The vibrations of the electrode 14 produce microphonic noises which impair the signal-to-noise ratio of the dosimeter system and make it more difficult to achieve a high degree of sensitivity and accuracy. In this case, the heating apparatus 34 is in the form of an evacuated heating enclosure.

To achieve the best signal-to-noise ratio, the electrodes 12 and 14 should be in good and solid mechanical engagement with the dielectric dosimeter body 10 to minimize microphonic noises. Any movement or vibration of the electrodes 12 and 14 while the external voltage since 238 is connected produces substantial microphonic noises or spurious signals which tend to mask small variations in the polarization and depolarization currents.

To minimize vibrations and microphonic noises, the electrodes 12 and 14 may be firmly clamped against the dosimeter body 10. Alternatively, the electrodes 12 and 14 may be deposited as coatings on the surfaces of the dielectric dosimeter body 10.

With further reference to the RITAP procedures of FIGS. 7 and 8, it will be recalled that we first irradiate the sample to produce trapped charge carriers, and then a voltage $V_p$ is applied. As we subsequently scan the temperature, we observe a transient current as shown in FIG. 8a.

At a temperature $T_v$, the transient current has subsided, and we switch the applied voltage to $V = O$. If we continue our scan with $V = O$, then we observe discharge (negative) currents at higher temperatures. The charge stored during the initial $V = V_p$ reading is subsequently discharged during the $V = O$ reading. In our experiments on $CaF_2$, we have actually found that the charge transfer O during $V = V_p$ is numerically equal to $(-Q)$ during $V = O$. If there are shunting resistances bridging the device, or if the electrodes can inject some change into the device, then one might not observe the exact quality of charge and discharge we have actually found. Nevertheless, the existence of even a small discharge current with $V = O$ indicates that the device is capacitive, even if it might be a somewhat leaky capacitor. In actual practice, our $CaF_2$ devices have been very leak-free.

Practically speaking, this charging-discharging effect is very useful. We get one dosimetry reading on the charging cycle, and a repeat reading on the discharge cycle.

Both the local RITAD procedures of FIGS. 1–6 and the RITAP procedures of FIGS. 7–10 give excellent response, excellent sensitivity, and excellent signal-to-noise ratio.

By actual measurement of the polarization device read-out current, we can detect and record a single 50 keV x-ray quantum absorbed. Since we never find only one-half of a quantum absorbed, it is unhelpful to increase the device response further.

In RITAP and RITAD dosimeters utilizing radiation induced thermally activated polarization and depolarization, we make a "capacitor" dosimeter rather than a "resistor" dosimeter. We try to make the charge transport produce a polarization rather than a flow. The following factors will be important:

(1) Just as for TL (thermoluminescence) or TSC (thermally stimulated condictivity) we need electron and hole traps, intrinsic or impurity doped, which are stable at the desired exposure temperature.

(2) Just as for TSC, and in contrast to TL, we want to minimize the intrinsic electron hole recombination.

(3) In contrast to TSC, however, we want to have retrapping. With no retrapping, the back-diffusion effect would spoil the polarization build up. On the other hand, if there are too many retrapping centers, the charges will not move very far, and the polarization effect will again be weakened. In $CaF_2$, we find that 10 ppm of trivalent impurities which produce ionic conduction at very high temperatures, can sometimes serve as retrapping sites, and we get nearly the theoretical (x-ray quantum shot) sensitivity limit.

(3.5) It is possible to get effective retrapping if there is a second set of very deep filled traps. For example, assume electrons are the mobile charges; the dosimetry charge release electrons polarize and then combine with the holes which are associated locally with the second set of deeply trapped electrons. Although the first set of electrons has disappeared, their polarization signal is retained by the second set of deeply trapped electrons. Here recombination does not destroy the signal since it is effectively retrapped.

(4) The electrode contact should be made electrically blocking, in contrast to the best TSC design. A small degree of electrode-to-dielectric interface conductance does not discharge the polarization effect, but it might decrease the response somewhat. The rule is that the conductivity of the electrode-dielectric interface should be small compared with the admitivity of the sample due to RITAP.

$$\text{Admitivity} = \frac{d_t(\text{Polarization})}{<E>}$$

where $<E>$ is the average electric field in the material.

(5) The measuring electrode contact must, however, be made with very good mechanical contact, again in contrast to TSC where this isn't necessary. The reason is that the RITAP stores charge; if the electrode wiggles around it will act like a capacitor microphone in the field of the stored charge and microphonic noise will be produced. This we do not want.

(6) At worst, surface currents due to spurious edge effects may polarize surfaces before the RITAP effect has a chance. At best, edge currents introduce additional noise. This seems more apparent in RITAP dosimetry than in TSC dosimetry. Fortunately, edge effects can be easily eliminated entirely by making a three terminal polarization measurement, using the guarded electrode configuration of FIG. 9.

(7) The guard electrode intercepts all spurious currents, and forces a "zero" potential plane at the measuring surface. Thus, the measuring electrode 14 senses the bulk sample polarization currents and only the sample polarization currents. The guard electrode isn't necessary in principle, but it often helps in practice.

(8) No charge ever leaves the dielectric material. The current is all polarization transport, i.e., dipole moment generation. Consequently, the sample doesn't have to be a single crystal. The grains do not even have to touch one another. This has been established by actual tests involving a compound RITAP dosimeter, comprising $CaF_2$, powder 10% by volume in an epoxy matrix. Just as in the local (electret) RITAD, the external voltage RITAP effect performs as well as with the same volume of $CaF_2$ in single crystal form.

(9) In actual tests of the true blocking vacuum gap measuring electrode arrangement of FIG. 10, we got the same signal (per active unit volume) with the vacuum gap measuring electrode, as with a deposited electrode. We also got an incredible increase in noise; the suspended electrode was fantastically microphonic. In fact there appears to be a new microphonic effect going on here.

For completeness, it should be reported that we also did the bias-electret local RITAD dosimetry with the vacuum gap configuration. We saw the same magnitude of dosimetry signal, but the microphonic noise went away. Obviously, the microphonic noise comes from the externally applied voltage. It can be eliminated by having solid mechanical connection between the sensing electrode and the dosimeter.

In high-purity $CaF_2$, we have actually measured RITAP signals with a 15 db signal-to-noise advantage over TL in $CaF_2$ (TLD-200) for the same experimental conditions. (TLD-200) is one of the most sensitive TL phosphors sold. Actually, we are really not much more sensitive than TLD-200 since even the TL in $CaF_2$ is pushing the x-ray quantum shot limit for precision.

It may be helpful to summarize various aspects of RITAP and local RITAD dosimeters.

Radiation induced thermally activated polarization (RITAP) dosimeters operate from an external voltage source polarizing the material during readout. This is the system shown in FIG. 9.

Local field radiation induced thermally activated depolarization (local RITAD) dosimeters operate from an internal source. The internal source is produced by pre-poling a very high temperature electret state in the material. The primary dosimetry phenomenon arises from exactly the same process as the RITAP effect.

The above phenomena differ from the radioelectret effect in which the radiation acts directly (and weakly as experimentally observed) on the electret state.

The above phenomena store charge and are polarization effects in contrast to conductance effects which simply allow a through-put flow of current.

Relative advantages of RITAP and local RITAD dosimetry techniques involve the following considerations.

In RITAP, we wish to suppress the sample's impurity linked ionic conductivity in order to minimize background polarization. In local RITAD, we wish to shift the electret state polarization temperature as high as possible in order to provide maximum bias-polarization stability. We now known that these two materials engineering problems are actually the identical same problem. That is, a low ionic conductivity low background RITAP dosimeter is automatically guaranteed to be a high temperature electret, thermally highly stable local RITAD dosimeter.

We have tested, for example, beryllia (beryllium oxide) ceramics. The electret depolarization temperature in preliminary experiments appears at about 850° C. A local RITAD dosimetry peak appears at about 320° C. Beryllia therefore provides the completely thermally stable RITAD-RITAP disometry system for room temperature or even higher temperature applications. In beryllia, a new factor is also observed. This is a RITAD-RITAP peak at about 200° C which seems to respond only to near ultraviolet radiation, but not to x-ray radiation. The 320° C. peak in contrast appears to respond only to the ionizing radiation, but not to the near ultraviolet radiation. Consequently, the beryllium oxide material seems to incorporate dosimetry properties both for ionizing radiations and for ultraviolet radiations in about the sunburn region of the solar spectrum.

The RITAP, externally driven, dosimeter is conceptually simpler to understand. There is no chance of using an accidentally unactivated device. Conversely, there is a chance the voltage source accidentally won't be turned on during readout.

The devices show huge charge-release spikes in RITAP above a certain voltage level. Using the local RITAD, we achieve twice the effective voltage and twice the signal without onset of the charge-release spikes. If the charge-release spikes are noise or uncontrollable phenomena, then the RITAD is advantageous. We have, however, experimental evidence that the charge-release "noise" spikes actually correlate with the RITAP peak. They appear to be an internal amplification effect on the RITAP phenomenon itself. If they can be understood and controlled, then the RITAP effect will acquire such high response as to be useful in wider applications such as, for example, a real time x-ray counting detector.

The local RITAD dosimeter requires bias-poling activation. Subsequently, however, it is self-powered which is a clear advantage for users.

The RITAP variation stores a polarization which later can be read-out as a second trial. In local RITAD, the ultimate "second trial" mechanism, the ionic conductivity is already pre-biased to give the electret state.

The local RITAD has a clear advantage as a dual-purpose dosimeter. In the low dose regime, it gives the same linear response, finally saturating at high doses, as does the RITAP variation. The bias-electret state, however, begins to show the radio-electret effect at high doses and one can use this read-out of a "decreasing" electret signal to measure large doses.

We claim:

1. A method of measuring radiation,
   comprising the steps of providing a dielectric body made of a dielectric material selected from a group consisting of alkaline earth fluorides, other alkaline earth halides, alkali metal fluorides, other alkali metal halides, alkaline earth oxide ceramics, and alkaline earth phosphate minerals,
   exposing said dielectric body to the radiation to be measured,
   providing an electrical current measuring circuit between a pair of electrodes on opposite sides of said body,
   and producing a depolarization current in said measuring circuit by raising the energy level of said dielectric body,
   said depolarization current being a measure of the radiation exposure.

2. A method according to claim 1,
   in which the energy level of said dielectric body is raised by raising the temperature of said body after exposure to the radiation.

3. A method according to claim 1,
   in which said dielectric body is given an initial bias polarization by subjecting said dielectric body to an electrostatic field prior to the exposure of said body to radiation.

4. A method according to claim 1,
   in which said dielectric body is given a polarization by subjecting said body to an external electrostatic field subsequent to the exposure of said body to said radiation.

5. A method according to claim 1,
   including the additional step of giving said dielectric body a polarization by subjecting said dielectric body to an external electrostatic field subsequent to the exposure of said dielectric body to radiation but prior to the production of the depolarization current in said measuring circuit,
   the energy level of said body being raised simultaneously with the subjection of said body to the external electrostatic field.

6. A method according to claim 1,
   in which said body includes a mixture of said dielectric material and a dielectric substance which is hydrogen-rich to produce ionizing radiation in response to neutron bombardment,
   said dielectric material being responsive to such ionizing radiation.

7. A method of measuring radiation,
   comprising the steps of providing a dielectric body made of a dielectric material selected from a group consisting of alkaline earth fluorides, other alkaline earth halides, alkali metal fluorides, other alkali metal halides, alkaline earth oxide ceramics, and alkaline earth phosphate minerals,
   exposing said dielectric body to the radiation to be measured,
   providing a circuit including measuring means and a voltage source between a pair of electrodes on opposite sides of said dielectric body,
   said voltage source producing a uni-directional voltage between said electrodes so as to subject said body to an electrostatic field,
   raising the energy level of said body and thereby producing a polarization current in said circuit,
   removing the voltage source from said circuit,
   and raising the energy level of said body by an additional amount and thereby producing a depolarization current in said measuring circuit,
   said polarization and depolarization currents being measures of the radiation exposure.

8. A method according to claim 7,
   in which the energy level of said dielectric body is raised by raising the temperature thereof.

9. A method according to claim 7,
   in which said body includes a mixture of said dielectric material and a dielectric substance which is hydrogen-rich to produce ionizing radiation in response to neutron bombardment,
   said dielectric material being responsive to such ionizing radiation.

10. A method of measuring radiation,
    comprising the steps of providing a dielectric body with a pair of electrodes on opposite sides thereof,
    said body being made of a dielectric material selected from a group consisting of alkaline earth fluorides, other alkaline earth halides, alkali metal fluorides, other alkali metal halides, alkaline earth oxide ceramics, and alkaline earth phosphate minerals,
    producing a state of electrostatic bias polarization in said dielectric body,
    exposing said dielectric body to the radiation to be measured,
    providing a measuring circuit between said electrodes,
    and measuring the electrical currents in said measuring circuit while raising the energy level of said dielectric body,
    currents being observed which are related to the exposure to radiation.

11. A method according to claim 10,
    in which said state of electrostatic bias polarization is produced by subjecting said body to an external electrostatic field while raising the temperature of said body to permit electrostatic polarization of said body by said field,
    and then lowering the temperature of said body while maintaining said field to freeze in said polarization,
    said external electrostatic field thereafter being removed.

12. A method according to claim 11,
    in which said external electrostatic field is produced by providing a voltage between the electrodes on opposite sides of said body.

13. A method according to claim 10,
    in which the energy level of said dielectric body is raised by raising the temperature of said body after exposure to radiation.

14. A method according to claim 10, in which currents are observed at one or more energy levels where no such current is observed in the absence of the exposure to radiation.

15. A method according to claim 10,
in which the energy level of said body is raised by raising the temperature of said body after exposure to radiation,
currents being observed at one or more temperature levels where no such current is observed in the absence of exposure to radiation.

16. A method according to claim 10,
in which said exposing step comprises exposing said dielectric body to x-rays, gamma rays and other forms of penetrating radiation.

17. A method according to claim 10,
in which said body includes a mixture of said dielectric material and a dielectric substance which is hydrogen-rich to produce ionizing radiation in response to neutron bombardment,
said dielectric material being responsive to such ionizing radiation.

18. A method of measuring ionizing radiation,
comprising the steps of providing a dielectric body having a pair of electrodes on opposite sides thereof,
said body being made of a dielectric material selected from a group consisting of alkaline earth fluorides, other alkaline earth halides, alkali metal fluorides, other alkali metal halides, alkaline earth oxide ceramics, and alkaline earth phosphate minerals,
producing a state of electrostatic bias polarization in said body by heating said body to an elevated temperature while providing a voltage between said electrodes and then maintaining said voltage while cooling said body to freeze in bias polarization,
said voltage then being removed,
exposing said dielectric body to the ionizing radiation to be measured,
providing a measuring circuit between said electrodes,
and raising the temperature of said body while measuring electrical currents in said circuit,
currents being observed at one or more temperatures where no such current is observed in the absence of exposure to radiation.

19. A method according to claim 18,
in which said body includes a mixture of said dielectric material and a dielectric substance which is hydrogen-rich to produce ionizing radiation in response to neutron bombardment,
said dielectric material being responsive to such ionizing radiation.

20. A radiation dosimetry device,
comprising a dielectric sample having an internal electrostatic bias polarization formed initially therein prior to exposure to radiation,
said sample being made of a dielectric material selected from a group consisting of alkaline earth fluorides, other alkaline earth halides, alkali metal fluorides, other alkali metal halides, alkaline earth oxide ceramics, and alkaline earth phosphate minerals,
said dielectric sample being free from any externally applied electrostatic field during exposure to radiation.

21. A radiation dosimetry device according to claim 20,
including a pair of electrodes on opposite sides of said dielectric sample and free of any externally applied voltage during exposure to radiation.

22. A radiation dosimetry device according to claim 21,
including short circuit means between said electrodes to prevent the accumulation of charges on said electrodes.

23. A radiation dosimetry device according to claim 20,
in which said sample includes a mixture of said dielectric material and another dielectric material which is responsive to a different kind of radiation.

24. A radiation dosimetry device according to claim 20,
in which said sample comprises a mixture of said dielectric material and an additional dielectric material which is hydrogen-rich to produce ionizing radiation in response to neutron bombardment,
said first mentioned dielectric material being responsive to said ionizing radiation.

25. A radiation dosimetry device, comprising
a dielectric sample containing a mixture of first and second dielectric materials,
said second dielectric material being in the form of a matrix,
said first dielectric material being dispersed in said matrix,
said first dielectric material being selected from a group consisting of alkaline earth fluorides, other alkaline earth halides, alkali metal fluorides, other alkali metal halides, alkaline earth oxide ceramics, and alkaline earth phosphate minerals,
said second dielectric material being hydrogen-rich to produce ionizing radiation in response to neutron bombardment,
said first dielectric material being responsive to such ionizing radiation.

26. A radiation dosimetry device according to claim 25, including
a pair of short-circuited electrodes on opposite sides of said dielectric sample.

27. A radiation dosimetry device, comprising
a dielectric sample containing a mixture of first and second dielectric materials,
said first dielectric material being selected from a group consisting of alkaline earth fluorides, other alkaline earth halides, alkali metal fluorides, other alkali metal halides, alkaline earth oxide ceramics, and alkaline earth phosphate minerals,
said second dielectric material being different from said first dielectric material and being responsive to a different kind of radiation,
and a pair of short-circuited electrodes on opposite sides of said dielectric sample.

28. A method of measuring radiation,
comprising the steps of providing a dielectric body made of a dielectric material having intrinsic or impurity doped electron and hole traps which are stable at the ambient temperature at which the measurement is to be made,
exposing said dielectric body to the radiation to be measured,
providing an electrical current measuring circuit between a pair of electrodes on opposite sides of said body, and producing a depolarization current in said measuring circuit by raising the energy level of said dielectric body, said depolarization current being a measure of the radiation exposure.

29. A method of measuring radiation, comprising the steps of providing a dielectric body made of a dielectric material having intrinsic or impurity doped electron and hole traps which are stable at the ambient temperature at which the measurement is to be made, exposing said dielectric body to the radiation to be measured, providing a circuit including measuring means and a voltage source between a pair of electrodes on opposite sides of said dielectric body, said voltage source producing a uni-directional voltage between said electrodes so as to subject said body to an electrostatic field, raising the energy level of said body and thereby producing a polarization current in said circuit, removing the voltage source from said circuit, and raising the energy level of said body by an additional amount and thereby producing a depolarization current in said measuring circuit, said polarization and depolarization currents being measures of the radiation exposure.

30. A method of measuring radiation, comprising the steps of providing a dielectric body with a pair of electrodes on opposite sides thereof, said body being made of a dielectric material having intrinsic or impurity doped electron and hole traps which are stable at the ambient temperature at which the measurement is to be made, producing a state of electrostatic bias polarization in said dielectric body, exposing said dielectric body to the radiation to be measured, providing a measuring circuit between said electrodes, and measuring the electrical currents in said measuring circuit while raising the energy level of said dielectric body, currents being observed which are related to the exposure to radiation.

* * * * *

UNITED STATES PATENT OFFICE
CERTIFICATE OF CORRECTION

Patent No. 4,016,422　　　　　Dated April 5, 1977

Inventor(s) Paul Richard Moran et al.

It is certified that error appears in the above-identified patent and that said Letters Patent are hereby corrected as shown below:

Column 1, line 40, at the end of the line, insert --has been exposed.--

Column 1, line 41, "thermoluminescene" should be --thermoluminescence--

Column 1, line 57, "characteristics" should be --characteristic--

Column 1, line 65-66, "thermoluminescene" should be --thermoluminescence--

Column 2, line 48, "on" should be --one--

Column 3, line 34, "view" should be --views--

Column 6, line 53, "responsive" should be --response--

Column 6, line 58, "favorable" should be --favorably--

Column 8, line 48, after "with" insert --the--

Column 8, line 49, "table" should be --tablet--

UNITED STATES PATENT OFFICE
CERTIFICATE OF CORRECTION

Patent No. 4,016,422  Dated April 5, 1977

Inventor(s) Paul Richard Moran et al.

It is certified that error appears in the above-identified patent and that said Letters Patent are hereby corrected as shown below:

Column 9, line 28, "advantageous" should be --advantages--

Column 9, line 67, "measure" should be --increase--

Column 11, line 60, "since" should be --source--

Column 12, line 62, "combine" should be --recombine--

Signed and Sealed this sixteenth Day of August 1977

[SEAL]

Attest:

RUTH C. MASON
Attesting Officer

C. MARSHALL DANN
Commissioner of Patents and Trademarks